United States Patent [19]

Duchene et al.

[11] Patent Number: 5,794,953

[45] Date of Patent: Aug. 18, 1998

[54] SHOPPING CART WITH ADVERTISING CARD MOUNT TO PLASTIC BASKET IN IMPROVED MANNER

[75] Inventors: Val-Jean Duchene, Broken Arrow; James F. Reinbold, Norman, both of Okla.

[73] Assignee: Unarco LLC, Atlanta, Ga.

[21] Appl. No.: 666,007

[22] Filed: Jun. 19, 1996

[51] Int. Cl.⁶ .................................................. B62B 3/00
[52] U.S. Cl. ............................... 280/33.992; 40/308
[58] Field of Search .................. 280/33.992, DIG. 4; 40/308; 224/411

[56] References Cited

U.S. PATENT DOCUMENTS

| | | | |
|---|---|---|---|
| 3,999,744 | 12/1976 | Rehrig | 280/33.99 R |
| 4,123,077 | 10/1978 | Joseph | 280/47.34 |
| 4,376,502 | 3/1983 | Cohen | 280/33.992 X |
| 4,616,839 | 10/1986 | Trubiano | 280/33.99 R |
| 4,773,175 | 9/1988 | Larsen | 40/308 |
| 4,922,639 | 5/1990 | Rehrig | 40/308 |
| 5,111,604 | 5/1992 | Rehrig | 40/308 |
| 5,201,134 | 4/1993 | Rehrig et al. | 40/308 |
| 5,210,968 | 5/1993 | Rehrig | 40/308 |
| 5,255,930 | 10/1993 | Jones et al. | 280/33.992 |
| 5,306,033 | 4/1994 | Evans | 280/33.992 |
| 5,331,756 | 7/1994 | Rehrig | 40/308 |
| 5,608,978 | 3/1997 | Sawyer et al. | 40/308 |

*Primary Examiner*—F. J. Bartuska
*Attorney, Agent, or Firm*—Dressler, Rockey, Milnamow & Katz, Ltd.

[57] ABSTRACT

In a shopping cart comprising a wheeled chassis, a handle structure, and a basket fastened to the wheeled chassis and to the handle structure, the basket comprises a front panel molded from a plastic material and two side panels molded therefrom. Each of the front and side panels has a generally uniform lattice of hexagonal structures, each bordering a similarly shaped region, at least most of those regions being hexagonal apertures. An advertising card covering a portion of a selected panel is fastened to the selected panel by fasteners pressed into holes in plugs pressed tightly into associated ones of the hexagonal apertures or by fasteners pressed into holes in closed regions defined by the generally uniform lattice. The fasteners have barbed, threaded, or bifurcated shanks.

17 Claims, 3 Drawing Sheets

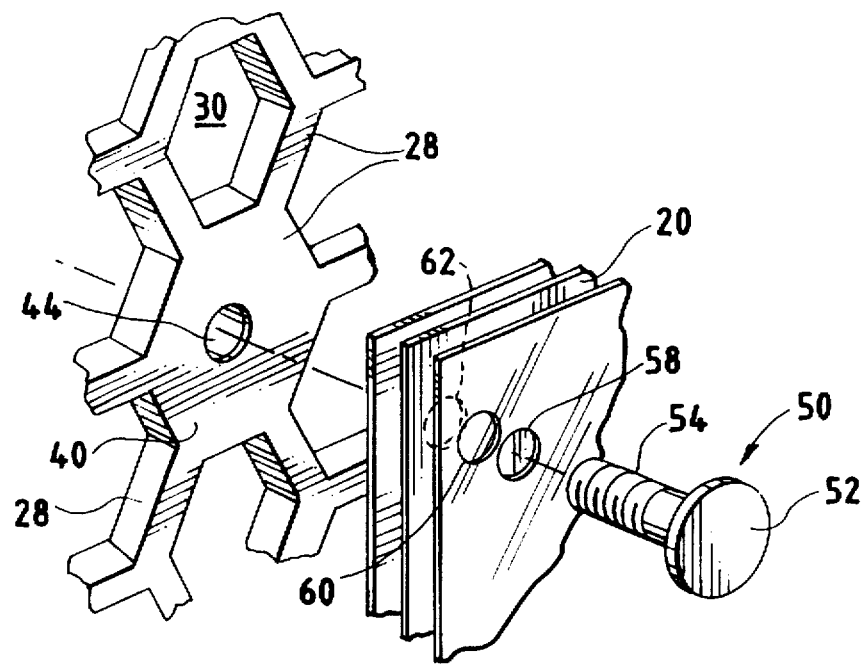
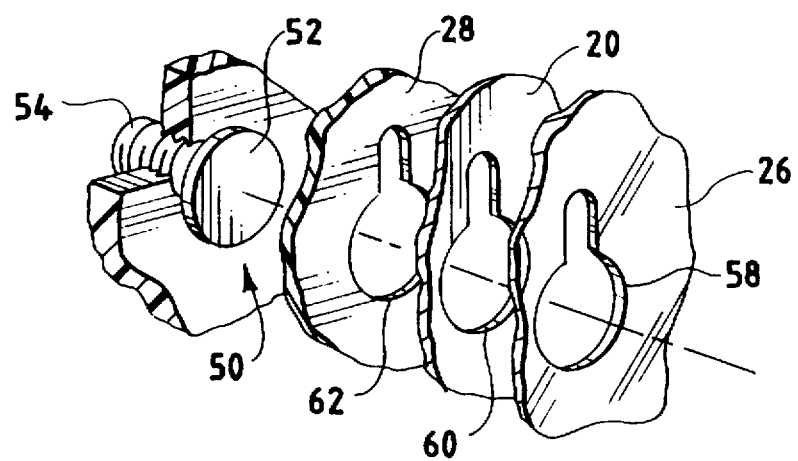

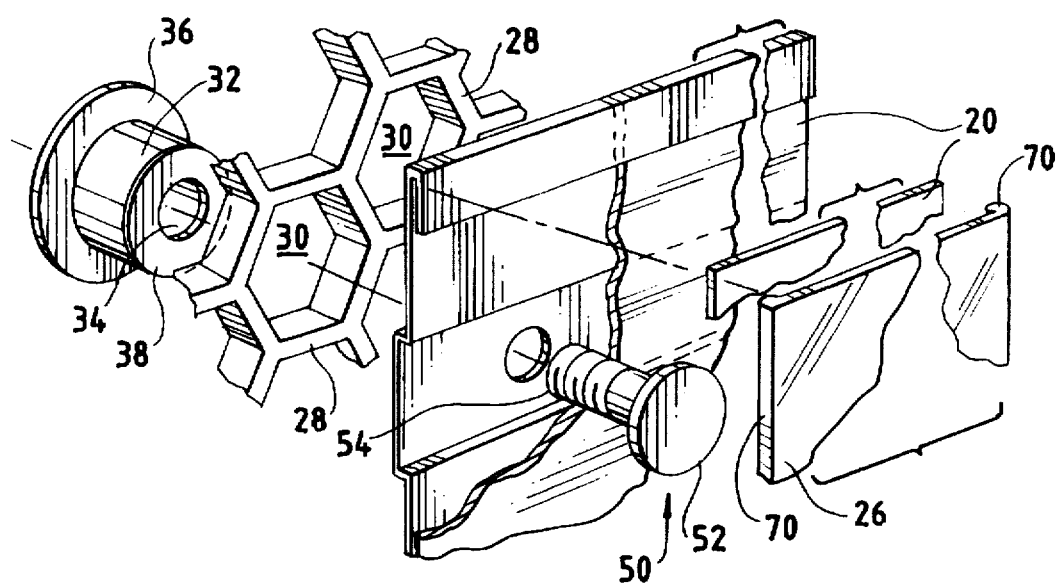
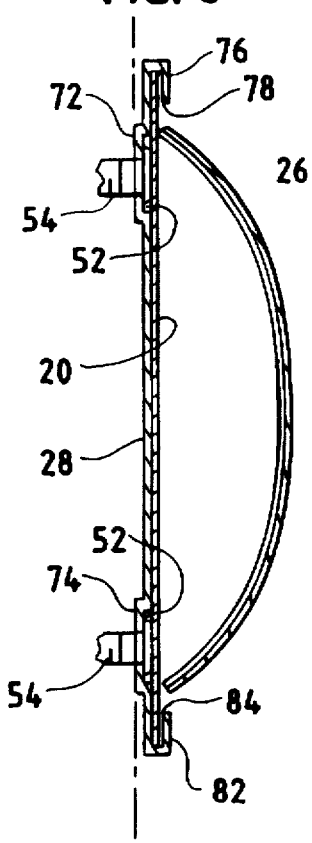
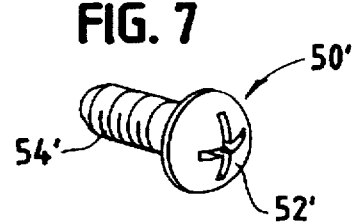
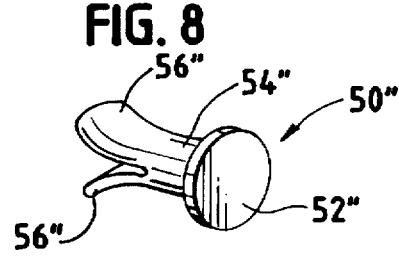

SHOPPING CART WITH ADVERTISING CARD MOUNT TO PLASTIC BASKET IN IMPROVED MANNER

TECHNICAL FIELD OF THE INVENTION

This invention pertains to a shopping cart of a type comprising a wheeled chassis, a handle structure, and a basket fastened to the wheeled chassis and to the handle structure, wherein the basket comprises a front panel molded from a plastic material and two side panels molded therefrom. This invention provides an advertising card, which is mounted to the front panel or one of the side panels in an improved manner allowing greater variabilities in the size, shape, and location of the advertising card.

BACKGROUND OF THE INVENTION

As illustrated and described in Jones et al. U.S. Pat. No. 5,255,930, each of the front and side panels of the basket of a shopping cart of the type noted above is molded from a plastic material, such as high density polyethylene, so as to have a generally uniform lattice of hexagonal structures, each bordering a hexagonal aperture.

Moreover, each of the side panels is molded so as to have a generally rectangular recess with a planar wall, a top slot, and a bottom slot. A generally rectangular frame having a top tab fitting into the top slot and a bottom tab fitting into the bottom slot is disclosed for retaining an advertising card of a cardboard or plastic material between the frame and the planar wall of the recess.

Because the recesses are molded into the side panels, the sizes, shapes, and locations of the recesses are fixed and govern the sizes, shapes, and locations of the advertising cards. Moreover, if the advertising cards are removed purposefully or accidentally, the planar walls of the recesses are exposed and may detract from the ornamental appearance of the shopping cart basket.

Other shopping carts employing snap-in frames to mount advertising cards in generally rectangular recesses in plastic panels of baskets are exemplified in Rehrig U.S. Pat. No. 4,922,639, No. 5,111,604, No. 5,210,968, and No. 5,331,756. In those shopping carts, the sizes, shapes, and locations of the advertising cards are governed by the sizes, shapes, and locations of the recesses.

This invention has resulted from efforts to mount an advertising card to a molded plastic panel of a shopping cart basket in an improved manner allowing greater variabilities in the size, shape, and location of the advertising card.

SUMMARY OF THE INVENTION

This invention provides a shopping cart comprising a wheeled chassis, a handle structure, and a basket fastened to the wheeled chassis and to the handle structure. The basket comprises a front panel molded from a plastic material and two side panels molded therefrom. Each of the front and side panels has a generally uniform lattice of polygonal structures, preferably hexagonal structures, each bordering a similarly shaped region. At least most of the similarly shaped regions are polygonal apertures, preferably hexagonal apertures.

Moreover, as contemplated by this invention, the shopping cart comprises an advertising card covering a portion of a panel selected from the front and side panels and means including a fastener at an associated one of the similarly shaped regions for fastening the advertising card to the selected panel. The fastener may pass through a hole in the advertising card.

If the associated region is a polygonal aperture, preferably a hexagonal aperture, the fastening means includes a plug pressed into the polygonal aperture defined by the associated region. The plug has a hole receiving the fastener. If the fastener has a head and a shank integral with the head, and if the shank passes through a hole in the advertising card, into the hole in the plug, the head retains the advertising card.

Alternatively, the associated region is a closed region, except for a hole receiving the fastener. If the fastener has a head and a shank integral with the head, and if the shank passes through a hole in the advertising card, into the hole in the closed region, the head retains the advertising card.

In a preferred embodiment, in which all of the similarly shaped regions of the selected panel define polygonal apertures, the fastener is one of a plural number of such fasteners and the plug is one of an equal number of such plugs. Each fastener passes through a different hole in the advertising card. Each plug is pressed into a different one of the polygonal apertures of the selected panel and has a hole receiving a different one of the fasteners.

In an alternative embodiment, in which the fastener is one of a plural number of said fasteners associated with the advertising card and in which the closed region is one of a group associated with the advertising card and comprised of an equal number of said closed regions of the selected panel, each fastener associated with the advertising card passes through a different hole in the advertising card and each closed region of the group associated with the advertising card has a hole receiving a different one of the fasteners associated with the advertising card.

If barbed or if bifurcated so as to form two tips tending to spread apart, the shank of the fastener is pressed into the hole in the plug or in the closed region, whereby the fastener cannot be easily removed. If threaded, the shank of the fastener is threaded into the hole in the plug or in the closed region, whereby the fastener can be easily removed.

These and other objects, features, and advantages of this invention are evident from the following description of several contemplated embodiments of this invention with reference to the accompanying drawings.

BRIEF DESCRIPTION OF THE DRAWINGS

FIG. 3, on a similar scale, is an exploded, fragmentary detail of one of the advertising panels, two protective sheets, the associated panel of the basket, and an associated fastener, which has a head and a barbed shank, as employed in an alternative embodiment of this invention.

FIG. 4, on a a similar scale, is an exploded, fragmentary view of one of the advertising panels, two protective sheets, the associated panel of the basket, an associated fastener, which has a head and a barbed shank, as employed in another alternative embodiment of this invention.

FIG. 5, on a a similar scale, is an exploded, fragmentary view of one of the advertising panels, two protective sheets having interengaging flanges, the associated panel of the basket, an associated fastener, which has a head and a barbed shank, as employed in another alternative embodiment of this invention.

FIG. 6, on a similar scale, is a vertical section showing assembly of the advertising card and the protective sheets in the embodiment of FIG. 5.

FIG. 7, on a similar scale, is a perspective view of an alternative fastener, which has a head and a threaded shank.

FIG. 8, on a similar scale, is a perspective view of an alternative fastener, which has a head and a bifurcated shank.

DETAILED DESCRIPTION OF THE ILLUSTRATED EMBODIMENTS

Figure 1:
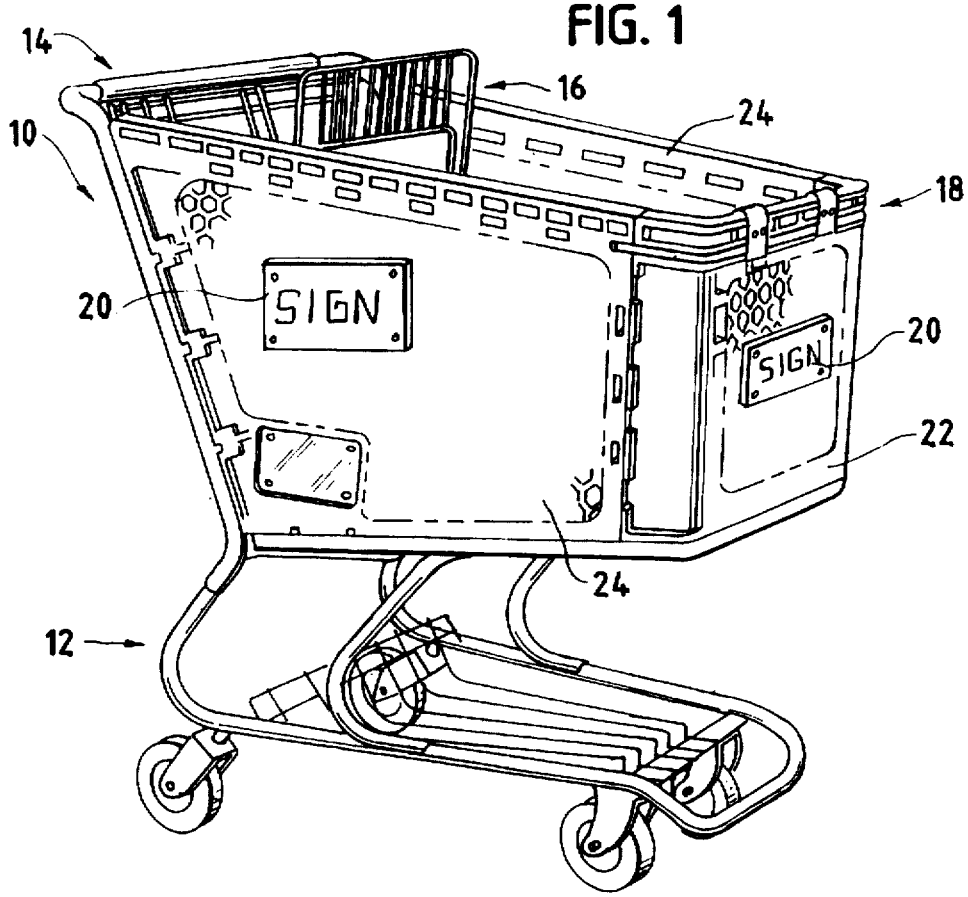
FIG. 1 is a perspective view of a shopping cart comprising a wheeled chassis, a handle structure, and a basket fastened to the wheeled chassis and to the handle structure, along with two advertising cards, which are mounted respectively to a front panel of the basket and to a nearer one of two side panels of the basket in an improved manner according to this invention.

As shown in FIG. 1, a shopping cart 10 comprising a wheeled chassis 12, a handle structure 14, a pivotable back 16, and a plastic basket 18 fastened to the wheeled chassis 12 and to the handle structure 14 is provided with two advertising cards 20, which are mounted respectively to a front panel 22 of the basket 18 and to a nearer one of two side panels 24 of the basket 18 in an improved manner according to this invention. Another advertising card (not shown) may be similarly mounted to the farther one of the side panels 24 of the basket 18.

Except as illustrated and described herein, the shopping cart 10 conforms to the shopping cart illustrated and described in Jones et al. U.S. Pat. No. 5,225,930, the disclosure of which is incorporated herein by reference. As illustrated and described in the Jones et al. patent noted above, the front panel 22 of the plastic basket 18, the side panels 24 of the plastic basket 18, and a bottom panel (not shown) of the plastic basket 18 are molded from a suitable plastic, such as high density polyethylene, each so as to have a generally uniform lattice of hexagonal structures 28, each bordering a similarly shaped region.

Figure 2:
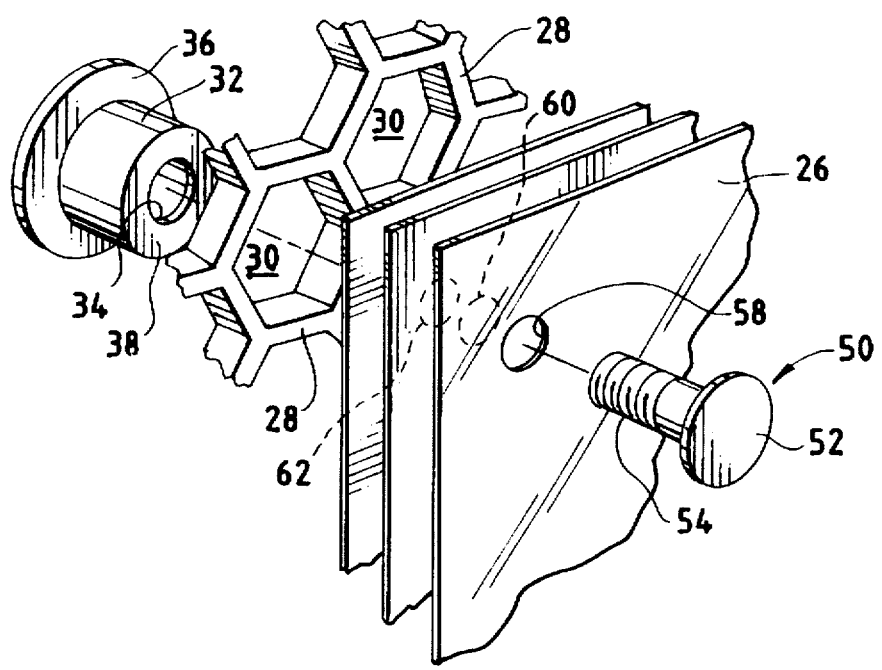
FIG. 2, on a larger scale, is an exploded, fragmentary detail of one of the advertising panels, two protective sheets, the associated panel of the basket, an associated plug, and an associated fastener, which has a head and a barbed shank, as employed in a preferred embodiment of this invention.

In the preferred embodiment of FIG. 2 and the alternative embodiment of FIG. 5, all of the similarly shaped regions bordered by the hexagonal structures 28 are hexagonal apertures 30. In the alternative embodiment of FIG. 3 and the alternative embodiment of FIG. 4, most of the similarly shaped regions bordered by the hexagonal structures 28 are hexagonal apertures 30, but some of the similarly shaped regions bordered thereby are hexagonal regions 40 (one shown) which are closed except for one hole 44 in each closed region 40 for a purpose to be later described. Four closed regions 40 are provided for each of the advertising cards 20, whether on the front panel 22 or on a side panel 24.

In the preferred embodiment of FIG. 2 and the alternative embodiment of FIG. 5, a plug 32 having a hole 34 for a purpose to be later described is pressed tightly into an associated one of the hexagonal apertures 30. The plug 32 may be made from a suitable metal, such as steel, brass, or aluminum, or a suitable plastic so as to have a head 36 and a shank 38, which may be barbed or knurled so as to retain the plug 32 in the associated aperture 30. The hole 34 extends through the head 36 and through the shank 38. Four such plugs 32 are provided for each of the advertising cards 20, whether on the front panel 22 or on a side panel 24, and each plug 32 is pressed into a different aperture 30 from within the basket 18 so that the head 36 of such plug 32 bears against the inner surface of whichever of the panels 22, 24, has the associated aperture 30 receiving such plug 32. The head 36 prevents such plug 32 from being pulled outwardly through the associated aperture 30 receiving such plug 32.

If made of a cardboard material, each advertising card 20 is mounted between two protective sheets, namely an outer sheet 26 and an inner sheet 28, which are made from a suitable, transparent plastic, such as polycarbonate, and which protect such advertising card 20 against damage due to abrasion or to dampness. The advertising card 20 may be pre-laminated between the protective sheets, in a known manner. If the advertising card 20 is made from a plastic material, the protective sheets are optional.

In the preferred embodiment of FIG. 2, and in the alternative embodiments of FIGS. 3, 4, and 5, similar fasteners 50 are used, four for each advertising card 20. Each fastener 50 is made from a suitable metal, such as steel, brass, or aluminum, or from a suitable plastic so as to have a head 52 and a shank 54, which is barbed.

In the preferred embodiment of FIG. 2, the outer sheet 26, and the inner sheet 28 are flat, rectangular sheets. The shank 54 of each fastener 30 is passed through an associated hole 58 in the outer sheet 28, an associated hole 60 in the advertising card 20, and an associated hole 62 in the inner sheet 28 and is pressed into the hole 34 in the associated plug 32. Because the shank 54 is barbed, the shank 54 cannot be easily pulled from the hole 34 in the associated plug 32. The heads 52 of the fasteners 50 are larger than the respective holes 58, 60, 62, so as to retain the outer sheet 26, the advertising card 20, and the inner sheet 26.

In the alternative embodiment of FIG. 3, the outer sheet 26, and the inner sheet 28 are flat, rectangular sheets. The shank 54 of each fastener 30 is passed through an associated hole 58 in the outer sheet 28, an associated hole 60 in the advertising card 20, and an associated hole 62 in the inner sheet 28 and is pressed into the hole 44 in the associated region 40. Because the shank 54 is barbed, the shank 54 cannot be easily pulled from the hole 44 in the associated region 40. The heads 52 of the fasteners 50 are larger than the respective holes 58, 60, 62 so as to retain the outer sheet 26, the advertising card 20, and the inner sheet 28.

In the alternative embodiment of FIG. 4, the respective holes 58, 60, 62 are keyhole-shaped so as to have lower portions larger than the heads 52 of the respective fasteners 50 and upper portions smaller than the heads 52 of the respective fasteners 50, and the respective fasteners 50 are pushed into the holes 34 in the respective plugs 32 so as to leave sufficient clearance for the outer sheet 28, the advertising card 20, and the inner sheet 28. Thus, the outer sheet 28, the advertising card 20, and the inner sheet 28 can be easily hung on the respective fasteners 50 and can be easily removed.

In the alternative embodiment of FIG. 5, the advertising card 20 is a flat, rectangular sheet. However, as shown, the outer sheet 26 has two side flanges 70, which are cover the side edges of the advertising card 20. Also, the inner sheet 28 has an upper offset 72 to accommodate the heads 52 of two upper fasteners 50, a lower offset 74 to accommodate the heads 52 of two lower fasteners 50, an upper flange 76 defining an upper recess 78 opening downwardly, and a lower flange 82 defining a lower recess 84 opening upwardly. In the upper offset 72, the inner sheet 28 has two upper holes 92 (one shown) to accommodate the shanks 54 of two upper fasteners 50. In the lower offset 74, the inner sheet 28 has two lower holes 94 (one shown) to accommodate the shanks 34 of two lower fasteners 50. The shank 54 of each of the upper fasteners 50 is passed through an associated hole 60 in the inner sheet 28, in the upper offset 72, and is pressed into the hole 34 in the associated plug 32. The shank 54 of each of the lower fasteners 50 is passed through an associated hole 60 in the inner sheet 28, in the lower offset 72, and is pressed into the hole 34 in the associated plug 30.

After the advertising card 20 is mounted to the inner sheet 28, as by being slid endwise into the upper recess 78 and the lower recess 84, the outer sheet 26 is bowed, as shown in FIG. 6, so as to permit the upper edge 86 of the outer sheet 26 to be then fitted into the upper recess 78 and so as to permit the lower edge 88 of the outer sheet 26 to be then fitted into the lower recess 84. Thus, as shown, the outer sheet 26 covers the heads 52 of the fasteners 50 as well as the advertising panel 20.

As shown in FIG. 7, a fastener 50' made from a suitable metal, such as steel, brass, or aluminum, or from a suitable plastic so as to have a head 52', which is slotted to receive a screwdriver tip (not shown) for driving the fastener 50', and a shank 54', which is threaded, may be alternatively used in any of the foregoing embodiments. The shank 54' is threaded into the hole 32 in the associated plug 30 or into the hole 42 in the associated region 40. If the fastener 50' is used, the shank 54' may be self-threading. Alternatively, the hole 42 in the associated plug 32 or the hole 44 in the associated region 40 may be prethreaded.

As shown in FIG. 8, a fastener 50" made from a suitable metal, such as steel, brass, or aluminum, or from a suitable plastic so as to have a head 52" and a shank 54" may be alternatively used in any of the foregoing embodiments. The shank 54" is bifurcated so as to form two tips 56" tending to spread apart when unstressed. Thus, when the shank 54" is pressed tightly into the hole 34 in the associated plug 32 or into the hole 44 in the associated region 40, the tips 56" must be first stressed ao as to force the tips 56" together. Thereupon, by tending to spread apart, the tips 56" restrain the fastener 50" against being removed accidentally.

In the preferred embodiment of FIG. 2 and in the alternative embodiments of FIGS. 3, 4, and 5, there is no need to mold the front panel 22 of the basket 18 or the side panels 24 of the basket 18 with recesses to accommodate the advertising cards 20. Therefore, if the advertising cards 20 are removed purposefully or accidentally, there is little or nothing to detract from the overall appearance of the basket 18.

Furthermore, in the preferred embodiment of FIG. 2 and in the alternative embodiment of FIG. 5, the advertising cards 20 can be conveniently fastened in any of an expansive range of possible locations on the front panel 22 of the basket 18 or on the side panels 24 of the basket 20. Therefore, this invention allows greater variability in the size, shape, and location of each advertising card 20.

Where hexagonal structures, apertures, and regions are specified above, polygonal structures, apertures, and regions, such as square, rectangular, or triangular structures, apertures, and regions may be alternatively used. Various other modifications may be made in any of the disclosed embodiments without departing from the scope and spirit of this invention.

We claim:

1. A shopping cart comprising a wheeled chassis, a handle structure, and a basket fastened to the wheeled chassis and to the handle structure, the basket comprising a front panel molded from a plastic material and two side panels molded therefrom, each of the front and side panels having a generally uniform lattice of polygonal structures, each of the polygonal structures bordering a similarly shaped region, at least most of the similarly shaped regions being polygonal apertures, an advertising card covering a portion of a panel selected from the front and side panels, and means including a fastener passing through a hole in the advertising card at an associated one of the similarly shaped regions for fastening the advertising card to the selected panel, wherein the associated one of the similarly shaped regions is a polygonal aperture, wherein the fastening means includes a plug pressed tightly into the polygonal aperture defined by the associated one of the similarly shaped regions, and wherein the plug has a hole receiving the fastener.

2. The shopping cart of claim 1 wherein the fastener has a head and a shank integral with the head, the head retaining the advertising card and the shank passing through the hole in the advertising card, into the hole in the plug.

3. The shopping cart of claim 2 wherein the shank of the fastener is barbed and is pressed tightly into the hole in the plug.

4. The shopping cart of claim 2 wherein the shank of the fastener is threaded and is threaded into the hole in the plug.

5. The shopping cart of claim 2 wherein the shank of the fastener is bifurcated so as to form two tips tending to spread apart and is pressed tightly into the hole in the plug.

6. The shopping cart of claim 1 wherein all of the similarly shaped regions of the selected panel define polygonal apertures, wherein the fastener is one of a plural number of said fasteners and the plug is one of an equal number of said plugs, wherein each fastener passes through a different hole in the advertising card, and wherein each plug is pressed tightly into a different one of the polygonal apertures of the selected panel and has a hole receiving a different one of said fasteners.

7. The shopping cart of any one of claims 1 through 6 wherein polygonal refers to hexagonal.

8. A shopping cart comprising a wheeled chassis, a handle structure, and a basket fastened to the wheeled chassis and to the handle structure, the basket comprising a front panel molded from a plastic material and two side panels molded therefrom, each of the front and side panels having a generally uniform lattice of polygonal structures, each of the polygonal structures bordering a similarly shaped region, at least most of the similarly shaped regions being polygonal apertures, an advertising card covering a portion of a panel selected from the front and side panels, and means including a fastener passing through a hole in the advertising card at an associated one of the similarly shaped regions for fastening the advertising card to the selected panel, wherein the associated one of the similarly shaped regions is a similarly polygonal region, which is closed except for a hole receiving the fastener and which is bordered within the generally uniform lattice by at least three of said polygonal apertures.

9. The shopping cart of claim 8 wherein the fastener has a head and a shank integral with the head, the head retaining the advertising card and the shank passing through the hole in the advertising card, into the hole in the closed region.

10. The shopping cart of claim 9 wherein the shank of the fastener is barbed and is pressed tightly into the hole in the closed region.

11. The shopping cart of claim 9 wherein the shank of the fastener is threaded and is threaded into the hole in the closed region.

12. The shopping cart of claim 9 wherein the shank of the fastener is bifurcated so as to form two tips tending to spread apart and is pressed tightly into the hole in the closed region.

13. The shopping cart of claim 8 wherein the fastener is one of a plural number of said fasteners associated with the advertising card, wherein the closed region is one of a group associated with the advertising card and comprised of an equal number of said closed regions of the selected panel, wherein each fastener associated with the advertising card passes through a different hole in the advertising card, and wherein each closed region of the group associated with the advertising card has a hole receiving a different one of the fasteners associated with the advertising card.

14. The shopping cart of any one of claims 8 through 13 wherein polygonal refers to hexagonal.

15. A shopping cart comprising a wheeled chassis, a handle structure, and a basket fastened to the wheeled chassis and to the handle structure, the basket comprising a front panel molded from a plastic material and two side panels molded therefrom, each of the front and side panels having a generally uniform lattice of polygonal structures, each of the polygonal structures bordering a polygonal aperture, an advertising card covering a portion of a panel selected from the front and side panels, and means including a plug pressed tightly into an associated one of the polygonal apertures and a fastener pressed into a hole in the plug fastening the advertising card to the selected panel.

16. The shopping cart of claim 15 wherein the fastener passes through a hole in the advertising card.

17. The shopping cart of claim 15 or 16 wherein polygonal refers to hexagonal.

* * * * *